United States Patent
Marocco

(10) Patent No.: US 6,682,691 B1
(45) Date of Patent: Jan. 27, 2004

(54) METHOD FOR CONSOLIDATION OF NATURAL STONE BLOCKS OR RECOMPOSITE BLOCKS

(75) Inventor: Giuseppe Marocco, Turin (IT)

(73) Assignee: Taltos SpA, Turin (IT)

( * ) Notice: Subject to any disclaimer, the term of this patent is extended or adjusted under 35 U.S.C. 154(b) by 0 days.

(21) Appl. No.: 10/130,668
(22) PCT Filed: Nov. 23, 1999
(86) PCT No.: PCT/EP99/09046
§ 371 (c)(1), (2), (4) Date: May 16, 2002
(87) PCT Pub. No.: WO01/38257
PCT Pub. Date: May 31, 2001

(51) Int. Cl.⁷ ............................................... B29C 49/00
(52) U.S. Cl. .................. 264/571; 264/36.1; 264/36.22; 264/36.18; 52/514; 156/94
(58) Field of Search ..................... 52/514, 511; 156/94; 264/36, 571, 36.1, 36.22, 36.18; 428/63; 29/402.02

(56) References Cited

U.S. PATENT DOCUMENTS 5,131,378 A * 7/1992 Marocco .................. 125/16.01
6,494,978 B1 * 12/2002 Bertram ....................... 156/79

\* cited by examiner

*Primary Examiner*—Carl D. Friedman
*Assistant Examiner*—Nahid Amiri
(74) *Attorney, Agent, or Firm*—Notaro & Michalds P.C.

(57) ABSTRACT

A method for consolidating blocks of natural stone or recomposed material includes placing the block on a platform over a liquid and gas impermeable base sheet with spacers. Liquid and gas impermeable lateral sheets with spacers are glued to the side walls and extend beyond the top of the block. The block is inserted into an autoclave and a vacuum is applied. A fluid resin is dripped on the top of the block to cover it and to flow into the interstices between the block and the sheets. The vacuum is removed from the autoclave so that the resin penetrates into fractures and cavities in the block and the resin is allowed or induced to harden.

12 Claims, 1 Drawing Sheet

METHOD FOR CONSOLIDATION OF NATURAL STONE BLOCKS OR RECOMPOSITE BLOCKS

FIELD AND BACKGROUND OF THE INVENTION

The present invention refers to a method for consolidating stone blocks, or stone materials in general, through sealing them with hardenable resins.

In the activity of transforming natural stone blocks into slabs or hand-manufactured articles the raw material, the block, is often defective and conditions the whole production cycle, from the mining stage to the laying of the hand-manufactured articles.

It is well known that marbles and natural stones in general are not homogeneous materials in that their structure is highly influenced by the mineralogical composition and by the geologic history of mineral deposits.

While other raw materials originate from production processes that can be monitored and improved, marble, granite and other natural stones are the result of millions of years of modifications of the terrestrial crust and testify to this through their structural heterogeneity.

On the other hand very often the heterogeneity of parts confers to a stone its appreciated chromatic and decorative characteristics. More precious and polychrome materials are naturally most defective materials because of their tormented geologic formation.

After the manufacturing process the presence of structural defects in materials complicates yard problems for laying, reduces the lifetime of hand-manufactured articles and causes a more difficult and expensive maintenance.

Extractive activity is the first stage of the production cycle. Quarry operations are conditioned by defects of the raw material, macro-defects, fissures and structural discontinuities of the deposit and are driven by them.

When the care taken is not sufficient to guarantee a percentage of marketable extracted material that covers the extraction costs, the layer is abandoned.

Next working phase comprises cutting of the quarry block by means of a saw frame for square blocks suitable for the production of slabs or by means of diamond disk saws for shapeless blocks or blocks squared but with many structural defects.

From saw frames can be obtained slabs that are sections of the quarry block, from disk saws can be obtained directly small dimension objects.

The structural defects present in the block influence the results in both cases. From the saw frame could come out broken slabs and, in the more serious cases, the whole block could crumble while cutting, with potential damage to the frame and with high economic losses.

From disk saws could instead come out a certain number of broken pieces.

In the following squaring operations of the manufactured articles and their calibration and/or polishing, the fissures and the residual fractures, also if they didn't cause fractures and divisions while cutting, can still create problems, causing the division of the same articles along the line of fracture.

While products that come out broken from disk saws could not be sheltered and find residual uses in the ulterior reduction of size or in the composition of various products in which the fragments are joined together by means of cement and resinous glues, for reparation by gluing the parts together, with approximate and expensive operations, is often attempted.

The slabs so recomposed and also slabs not broken, but that don't give sufficient guarantees for going on with the process up to the final polishing, are often subjected to reparation and reinforcement operations.

These operations consist in dripping very fluid gluing resins on the surface of the damaged slab so that their infiltrating and following hardening connects together the disconnected parts.

Often together with this provision is made a reinforcement of the back face of the slab by means of webs or fiber glass or cotton or other fibers glued to the same slab.

The technical evolution of production lines, more and more automated and fast, has given impulse to these reparation techniques, but the results are modest and partial.

Moreover such techniques are useful only for slabs which come out not fragmented from the blocks.

For many blocks the process doesn't even start for the high risk of crumbling under the saw frame. In other cases the process starts but ends with a very low percentage of whole slabs.

The structural weakness of many raw stone materials is the reason why the stone activity has many difficulties to find industrial applications and continues in a hand-manufacturing way also in presence of a natural vocation for mass-production work.

An alternative technique that allows recovering raw material blocks of good decorative quality but with many structural defects, consists in impregnating the natural stone block with hardenable resins before starting the working cycle in factory.

Several attempts have already been done in this sense on parallelepiped blocks, driven from the logic that a process of impregnation in a vacuum state with resins able to shelter structural defects inside the block, would allow the resin to reach all structural defects which are in communication on the outside because of appearing of the defects on the surface of one of the six faces of the block.

But no one of these attempts allowed to reach acceptable technical-economic results, the consumption of resins necessary to the process is too elevated, the resins are in fact very expensive, and the same factories are expensive and difficult to manage.

Disregarding the treatment of the shapeless blocks, that is always disadvantageous, the treatment of parallelepiped square blocks requires heavy and expensive formworks that must be built around the block to form a tank that contains the block and the impregnation resin.

Since the quarry blocks don't ever have the same dimensions, the problem of maintaining acceptable the consumption and the cost of the necessary impregnation resins remains without solution.

Some attempts have been made in order to use variable size formworks, but, besides the more elevated cost of the structure, the sealing between the walls forming the formwork was not guaranteed.

Italian Patent 1027222 described a method for forming a flexible container around a stone block, in particular a plastic bag, filling the spaces between the block so contained and the walls of a pressure tight container with an oil of specific weight. similar to the specific weight of the resins introduced inside the container.

Varying the level of the oil around the block, wrapped and protected from the plastic bag, it is possible to regulate the quantity of impregnation resin around the block.

Moreover it is provided that the oil is recovered after each operation in a reservoir external to the container to be subsequently reused in following impregnation operations.

This method nevertheless presents operational limits deriving from technical difficulties in the practical realization of the idea, beyond involving elevated management costs.

SUMMARY OF THE INVENTION

A first object of the present invention is therefore to make possible and practicable the impregnation of a whole quarry block with a vacuum impregnation process using hardenable adhesive resins.

These and other objects are reached from the impregnation method according to the present invention, as claimed in the accompanying claims.

The method according to the invention can be advantageously used for the consolidation of marble or stone blocks of various dimensions reducing the waste of resin and the total costs of treatment.

BRIEF DESCRIPTION OF THE DRAWINGS

The above and other objects of the invention will result more clear from the description of a preferred embodiment with reference to the accompanying drawings in which:

The FIG. 1 shows a block of marble covered by elastomer sheets, ready for the resin impregnation treatment according to the method of the present invention; and The FIG. 2 shows a particular of the elastomer sheet.

DESCRIPTION OF THE PREFERRED EMBODIMENT

Figure 1:
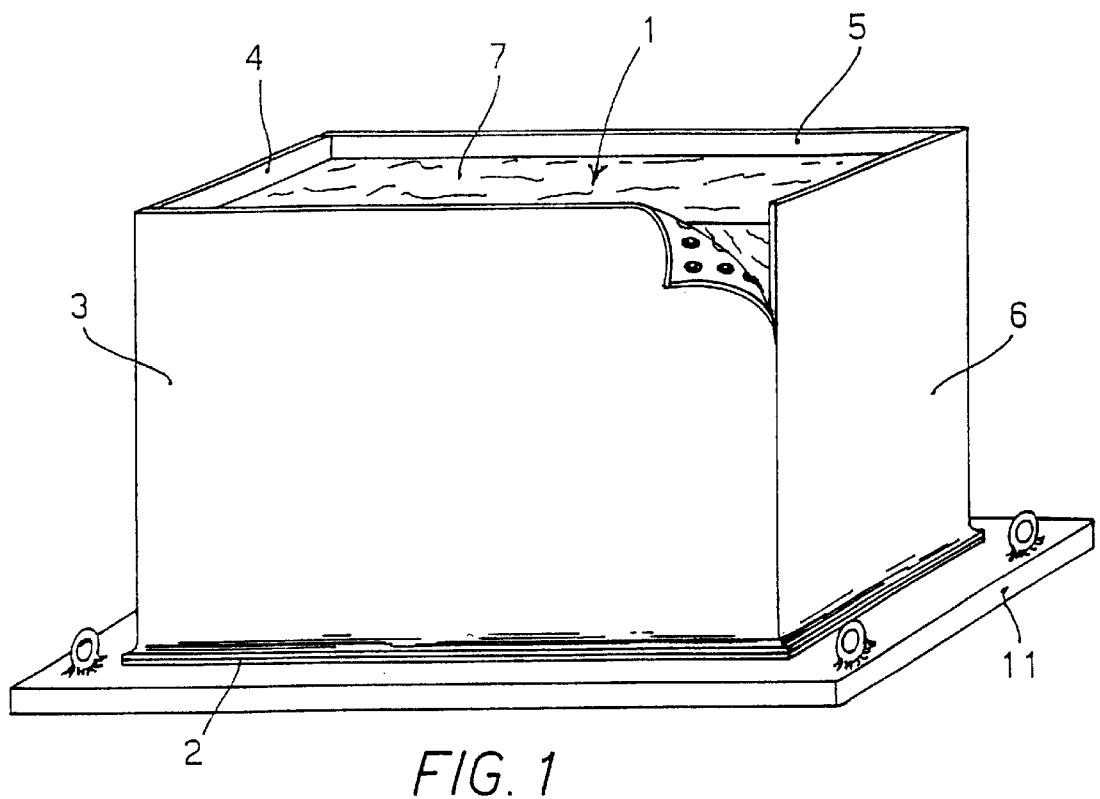
Figure 2:
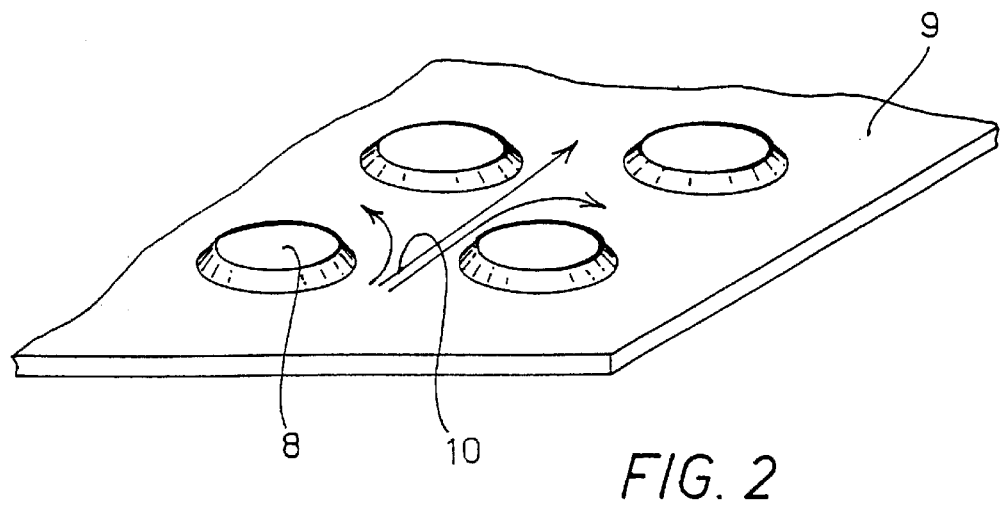

With reference to the FIGS. 1 and 2 a method for impregnating and consolidating a block of natural stone or recomposed material is now described, which we will call from now on simply "block".

The block 1 can in fact be of any stone material or other similar material, as marble or natural granite, or it could be a block of stone recomposed material.

The block 1 is initially subjected to heating for a period of time sufficiently long to reach an inside temperature of at least 20° C.

This heating is done, by inserting the block into a heating chamber, and by means of hot air, electric heating elements or sets of infrared ray lamps.

The block is then placed on a flat and rigid platform 11, for laying and transporting, with interposition of a base sheet 2, having dimensions exceeding by some centimeters the dimension in plan of the block, on which are arranged some discontinuous spacers.

The base sheet 2 is a sheet, preferably having a smooth and impermeable to liquids and gases surface, made of elastomer, plastics, impregnated fiber or thin metal.

The spacers could be for instance strips or pieces of the same material of the base sheet disposed on the sheet in a discontinuous way in order to form a net of intercommunicating channels 10 under the block 1.

Alternatively the base sheet 2 could be an elastomer sheet, of the type commonly used for sheet-paving, a particular of which is shown in FIG. 2, whose surface presents some circular relief zones 8, repeated and frequent.

Subsequently, to the four vertical faces of the block 1, are applied four lateral sheets 3, 4, 5, 6, impermeable to liquids and gases, with interposition of spacer elements 8, integral with the lateral sheet and glued to the wall of the block.

The lateral sheets 3,4,5,6 are preferably elastomer sheets, like that shown in FIG. 2 and commonly used for sheet-paving, having on its surface circular relief zones 8, that works as spacer elements.

In general the lateral sheets 3,4,5,6 can be thin plain sheets made of metal, plastics, rubber or impregnated fabric, while the spacer elements can be obtained on the block's surface, or on the sheets surface, by means of gluing or painting, and subsequently glued respectively to the surface of the sheets or to the wall of the block 1.

The lateral sheets are glued together on the bordering sides and glued on their inferior edge to the base sheet 2, in order to form a sheath that wraps the block in a watertight container.

In correspondence of the edges of the block could be glued some angular reinforcements for increasing the hydraulic and vacuum seal of the container.

Alternatively the vertical walls can be wrapped by a single sheet folded up around the block, reducing in this way the glued parts and further increasing the sealing.

The lateral sheet or sheets are some centimeters higher than the block 1, in such a way to form onto the block a containment basin for a fluid resin that will be subsequently dripped over the block.

The platform on which the block is placed is then transferred in a pressure tight container, or autoclave, endowed with openings for the passage of the impregnation resins and eventually with a porthole for allowing an operator the visual control of the process.

The resins can be dripped on the block by means of a pipe which draws from a container placed on a lower level, thanks to the vacuum eddy inside the autoclave or, alternatively, by means of pumps.

The autoclave is then evacuated into a vacuum state in order to obtain a rapid drying in depth of the block, favoured by the preheating and by the reduced vapour tension of the water to pressures as more reduced. It is also possible to use some known techniques for improving and accelerating the drying process, for instance using cold elements placed inside the autoclave.

After the drying of the block and the attainment of a residual pressure not higher than 20 torr, or however a pressure the most possible near to the vacuum, the resin is progressively introduced up to cover the superior face of the block.

The resin can therefore flow without obstacles in the interfaces between block and covering sheets, under the block and eventually also in the more remarkable fractures present in the block.

The resin destined to penetrate subsequently in the small fractures and structural discontinuities of the block is accumulated, in this stage, above the superior face of the block. The thickness of fluid resin to be accumulated on the block depends on the type of stone to restore, and on its defects and is determined by experience on statistical bases.

It is important that the block is completely covered by the resin as a possible fissure uncovered on the superior surface of the block would allow the air to infiltrate inside of the block jeopardising the pressure impregnation process.

Subsequently the autoclave is reconnected with the external atmosphere and the air, re-entering in the autoclave, pushes on the surface of fluid resin forcing it to penetrate into the block.

In order to increase the penetration of the resin into the block after the re-establishment of the atmospheric pressure in the autoclave, an overpressure could be introduced for increasing the pressure on the superior face and favouring the flowing of the resin also in the micro-fissures of the material inside the block.

The platform with the block is therefore extracted from the autoclave and the resin is let harden in a natural way or by means of heating of the same block.

The block is then carried under the saw frame for cutting or on the disk-saw and is cut without the necessity of removing the elastomer covering that covers the block on five sides.

The above described method is simple, it doesn't make use of rigid containment formworks and it can be applied to blocks of any dimension, provided they are relatively squared.

Besides, given the low cost of the elastomer sheets and the small quantity of wasted resin, the process is economical and very convenient.

What is claimed is:

1. A method for consolidating a block of natural stone or recomposed material having fractures and internal cavities, the block having a bottom, side walls and a top, the method comprising the steps of:

wrapping the side walls and bottom of the block to be consolidated with an impermeable sheath having spacers facing the side walls and bottom to define a free space between the sheath and the block;

placing the block with the sheath thereon, in an autoclave;

applying a vacuum to the autoclave so that the free spacer is exposed to vacuum;

applying a fluid hardenable resin into the free space being exposed to the vacuum;

thereafter removing vacuum from the autoclave so that rising pressure in the autoclave forces the resin to penetrate the fractures and internal cavities of the block; and allowing or inducing the resin to harden to consolidate the block.

2. A method according to claim 1, including: placing the block to be consolidated on a base sheet of liquid and gas impermeable material having discontinuous spacers thereon, the base sheet being on a flat and rigid platform for laying and transporting the block; applying to each side wall of the block, a lateral sheet of liquid and gas impermeable material having spacers thereon that are integral with each lateral sheet; gluing each lateral sheet to a respective side wall with the spacers facing the side walls to define some of the free spaces; and dripping on the top of the block and into the free spaces between the block and the sheets, the fluid hardenable resin in order to cover the block completely.

3. A method according to claim 2, wherein the base sheet and the lateral sheets have dimensions that are larger than dimensions of the respective bottom and side walls of the block so that the sheets overlap each other at corners of the block and gluing the overlap of the sheets to each other to close the sheath in a liquid and gas impermeable manner.

4. A method according to claim 3, wherein the lateral sheets extend above the top of the block to form a containment basin for the fluid resin.

5. A method according to claim 4, including gluing angular reinforcements at corners of the block for increasing a hydraulic and vacuum seal of the sheath.

6. A method according to claim 2, including wrapping all the side walls of the block with a single sheet that forms the lateral sheets for all the side walls.

7. A method according to claim 2, including initially heating the block for facilitating drying and evaporation of water contained inside the fractures and cavities.

8. A method according to claim 7, including accelerating the drying by condensation of emitted vapors on refrigerated elements placed inside the autoclave when the autoclave is under vacuum conditions.

9. A method according to claim 2, including applying overpressure to the block after removing the vacuum from the autoclave to increase penetration of the resin into the block.

10. A method according to claim 1, wherein the spacers maintain an inside surface of the sheets outwardly from an outside surface of the block to form flowing channels for the fluid resin.

11. A method according to claim 2, wherein each lateral sheet is an elastomer sheet having, on its surface coupled to the block, relief zones in contact with the surface of the block and glued to the block.

12. A method according to claim 2, wherein each lateral sheet is a thin plain sheet made of metal, plastics, rubber or impregnated fabric and the spacers are obtained on the block surface by means of gluing or painting and are subsequently glued to the surface of each lateral sheet.

* * * * *